(No Model.)
D. P. SHARP.
VEHICLE SPRING.
No. 291,412. Patented Jan. 1, 1884.
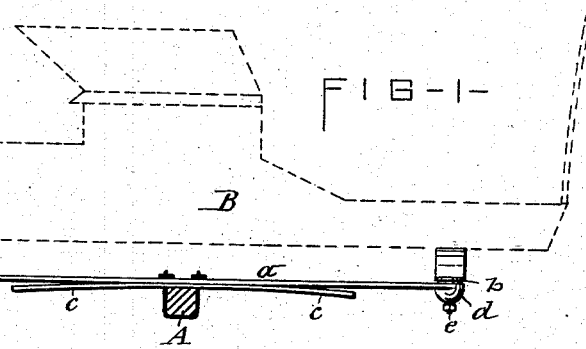
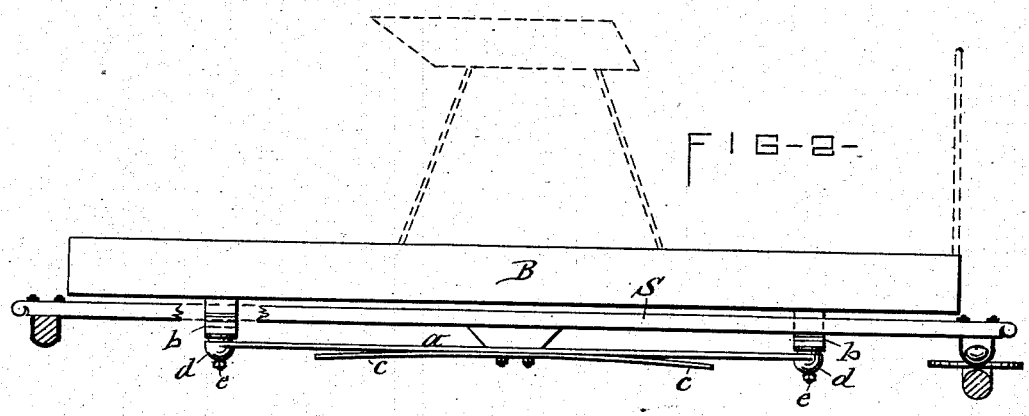
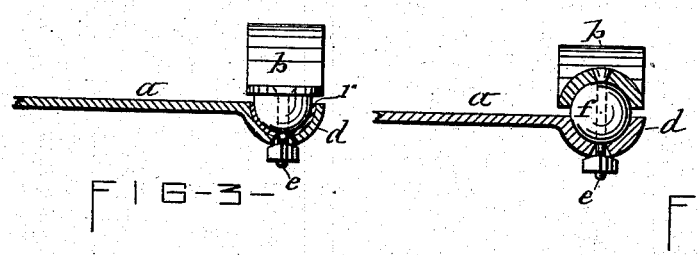
Witnesses—
Inventor—
Dennis P. Sharp

UNITED STATES PATENT OFFICE.

DENNIS P. SHARP, OF ITHACA, NEW YORK.

VEHICLE-SPRING.

SPECIFICATION forming part of Letters Patent No. 291,412, dated January 1, 1884.

Application filed July 24, 1883. (No model.)

*To all whom it may concern:*

Be it known that I, DENNIS P. SHARP, of Ithaca, in the county of Tompkins, in the State of New York, have invented new and useful Improvements in Vehicle-Springs, of which the following, taken in connection with the accompanying drawings, is a full, clear, and exact description.

This invention consists in certain peculiar means of connecting ball-and-socket-jointed ends of two springs, all as hereinafter more fully explained, and set forth in the claims.

In the accompanying drawings, Figure 1 is a side view of my invention as applied to a two-wheeled vehicle. Fig. 2 illustrates its application to a four-wheeled vehicle, and Figs. 3 and 4 are enlarged sectional views illustrating the connection of the two springs.

Similar letters of reference indicate corresponding parts.

$a$ and $b$ represent, respectively, the side and cross springs of a vehicle. The body B is mounted on the cross-springs, which are supported by their ends coupled to the ends of the side springs, which latter may be firmly secured at the center, either to the axle A of a two-wheeled vehicle, as shown in Fig. 1, of the drawings, or to side bars, S, riding on the hind axle and forward bolster of a four-wheeled vehicle, as represented in Fig. 2 of the drawings. In either case the ends of the side springs receive a downward pressure, which causes said ends to deflect when subjected to a load. To prevent excessive deflection of said springs, they have heretofore been re-enforced by additional leaves applied to the top of the central portion of the springs, and made to constantly bear with their entire length on the same. This construction causes the vibration of the springs to produce friction between the leaves, and also maintains the single-leaved ends of the spring at a uniform length during the motions of the spring, and thus limits the action of the same accordingly.

An attempt has been made to re-enforce a spring by additional leaves fastened at one end to a prolonged spring-supporting bar by separate and independent attachments at opposite sides of the attachment of the main leaf, the supplemental leaves having been isolated from the main leaf throughout their length. Such combination and arrangement of parts, however, required extra attachments for the supplemental leaves and failed to afford the requisite stability to said leaves, inasmuch as said end attachment was subjected to undue strain. Furthermore, when the supplemental leaves were brought into action they did not gradually increase their bearings on the main leaf, but came with their free end suddenly to a bearing on the body of the vehicle or its supporting-bar, and consequently produced jars and rattling. In another instance a half-spring has been combined with an elliptic spring, which supported the body of the vehicle, and although said two springs were connected at the center and the ends of the half-spring were isolated from the elliptic spring, yet the former were connected with the body, and the half-spring or supplemental spring received the strain directly on its ends, and consequently acted, to a great extent, independent of the main or elliptic spring. To overcome these defects I employ, in connection with the main leaf of the spring, a supplemental leaf, $c$, the central portion of which is contiguous to or lies directly on the central portion of the main leaf, and is secured to the spring-support by the same attachment which fastens the main leaf. The extremities of the supplemental leaf are gradually deflected, so as to cause them to normally stand isolated from the main leaf and free from connections with the body or any other part of the vehicle, as shown in Figs. 1 and 2 of the drawings, so that the action of said supplemental leaf depends solely on the action of the main leaf. The result of this arrangement is that, when a load is applied to the vehicle, the main leaf is depressed and caused to gradually increase its bearings on the supplemental leaf from the center toward the ends thereof, thus gradually receiving the support of the supplemental leaf throughout the action of the main leaf without producing jars or rattling of the spring.

This renders the spring very sensitive, and yet affords the same stability as that obtained by the ordinary construction of analogous springs. The connection of the cross-spring with the side spring I form by lapping the end of the former over the end of the latter, and fitting the overlapping portions to each other with a ball-and-socket joint, d, which may consist either of two concavo-convex end portions of the springs resting one in the other, as shown in Fig. 3 of the drawings, or of two cup or socket shaped ends of the springs embracing an interposed ball, f, as represented in Fig. 4 of the drawings. In either case the parts are coupled together by means of a bolt, e, passing vertically through the ball-and-socket joint, as shown.

I am aware that springs have been connected by a ball-and-socket joint, and I therefore do not claim the same, broadly.

By placing a rubber or leather disk, r, between the ball and socket, the rattling of the joint is to a great extent obviated.

Having described my invention, what I claim as new, and desire to secure by Letters Patent, is—

1. The improved spring-coupling consisting of a ball-and-socket joint formed on the ends of the springs, and a coupling-bolt passing through the center of said joint, substantially as described and shown.

2. The combination, with the ball-and-socket joint, of the cushion r, interposed between the ball and socket, and the coupling-bolt e, passing vertically through the joint, all substantially in the manner shown and set forth.

In testimony whereof I have hereunto signed my name and affixed my seal, in the presence of two attesting witnesses, at Syracuse, in the county of Onondaga, in the State of New York, this 18th day of July, 1883.

DENNIS P. SHARP. [L. S.]

Witnesses:
FREDERICK H. GIBBS,
WM. CHANDLER RAYMOND.